July 16, 1957     S. R. GRINSTEAD ET AL     2,799,589
PACKAGING (VACUUM)
Original Filed March 2, 1954
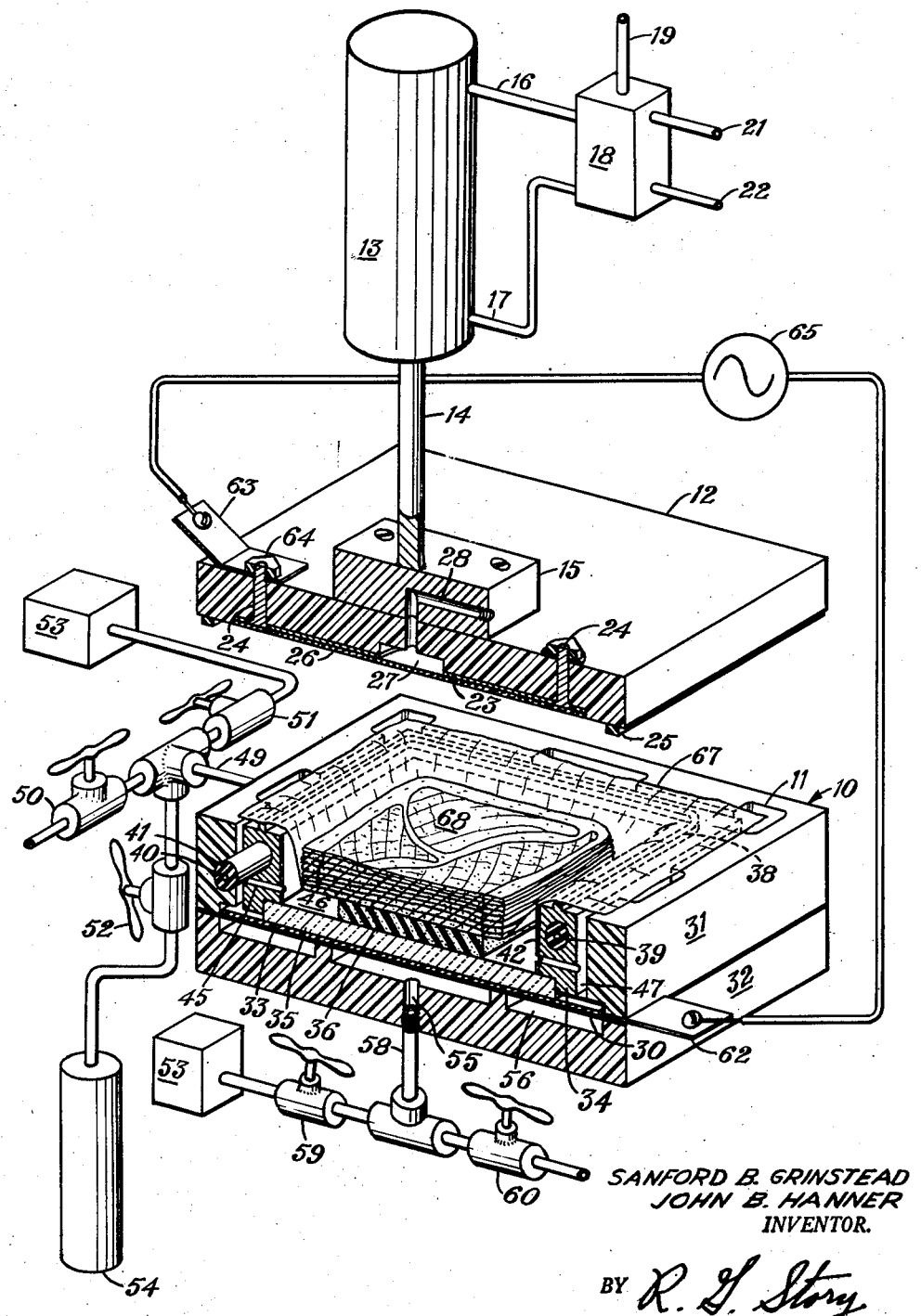
SANFORD B. GRINSTEAD
JOHN B. HANNER
INVENTOR.
BY R. G. Story
ATTORNEY

2,799,589

PACKAGING (VACUUM)

Sanford R. Grinstead, Whiting, Ind., and John B. Hanner, Stockton, Calif., assignors to Swift & Company, Chicago, Ill., a corporation of Illinois Original application March 2, 1954, Serial No. 413,617. Divided and this application February 14, 1955, Serial No. 488,102

5 Claims. (Cl. 99—171)

The present invention relates to a method for preparing packages of product, particularly packages which are sealed with a controlled atmosphere within the package.

Consumer demand has required the use of transparent packages to an ever increasing extent. The easiest and least expensive way to produce such a package is to use one of the transparent films such as cellophane, a rubber hydrochloride film like that sold under the trade mark "Pliofilm" or a polyvinylidene chloride plastic film, such as that sold under the trademark "Saran." The film of course will vary depending upon the conditions involved in its use.

It has been found that many products will better retain their appearance and flavor or other useful or necessary qualities if the conditions within which the product is held are special, i. e. something different than atmospheric. For example, in many instances food products, such as coffee, are packed in a vacuum or the container may be backfilled with a gas which for the purposes under consideration may be considered to be inert, as for example nitrogen. Similar procedures are being applied with respect to meats and other food products. Obviously similar procedures could be applied to nonfood products.

A big problem in preparing packages of product in which the internal atmosphere of a package is special, i. e. something other than atmospheric, is the prevention of "leakers." As the term implies, a "leaker" is one having an opening in the package which dissipates the special condition desired within the package. The principal object of the present invention is to provide a method for the packaging of product in a wrapping material in such a manner that the incidence of leakers is at least greatly reduced.

The majority of leakers seem to be occasioned by one or the other of two factors. The first of these is the existence of weak spots or defects in the sealing technique. The second of these is the handling of the package after it has been formed and sealed. The second of these was solved to a very substantial extent by the techniques set forth in Patent No. 2,621,129, wherein a backing board is employed which has a suitable lamination to which the transparent film may be sealed, although the present invention further reduces the "leakers" occasioned by handling by eliminating stresses in the wrapping material. The first mentioned of the problems has continued to exist because of the folds and irregularities in the film resulting when the film is folded about the product and then flattened on the laminated backing board. The method of the present invention is directed to the smoothing out and flattening of the folds, as well as the elimination of stresses and strains in the film that would remain after the sealing was accomplished.

A second object of the invention is the production of a neat appearing package wherein the film is drawn smoothly and snugly over the product with no unsightly bulges or the like. The appearance of the product in the package is a very substantial factor in its sales, particularly when the sales are made by free choice such as occurs in self-service stores.

A further object of the invention is the reduction of the amount of residual air in an evacuated and sealed package. With products where air has a deleterious effect, the lowering of the amount of residual air will obviously have a better effect on the product. While in theory evacuation could be continued indefinitely, there exists a practical limit to which it may be carried, or beyond which it is uneconomical to carry it, in packaging operations. Having reached this practical limit the present invention reduces the residual air without further evacuation.

Further objects and advantages will become apparent from the following description taken in conjunction with the drawing, which is an isometric view of a section of an embodiment of the invention with portions thereof being diagrammatically illustrated.

The method by which the objects of the present invention are achieved is to first place the product within the packaging material. The atmosphere within the wrapping material and about the product is then adjusted to that which is desired and the edges of the wrapping material are clamped shut to produce a fluid-tight joint. While the foregoing is taking place, the wrapping film and the atmosphere about the product are heated. The effect of the heating of the wrapping film is to make the film more pliant and in some practices to soften the film so that it will conform to bends and irregularities necessitated by the drawing of the film over the product. Latent stresses in the film are reduced or eliminated. The film assumes much the same shape as would a preformed sheet of plastic, yet the cost involved is many times less than would be with the preforming of blanks.

The effect of the heating of the atmosphere is to reduce the density of the air so that it has less weight per unit volume. When this less dense air is reduced to the same absolute pressure that would be achieved under the prior practices when the density of the air was unaffected and the package sealed in that condition, the residual amount of air within the package will be less than it would be had the air not been made less dense before evacuation and sealing.

Subsequently a pressure is slowly applied to the outside of the wrapping film. This causes the heated film to conform to the sides of the product and aids in producing in the film a drawn effect corresponding to a preformed blank. The edges of the wrapping material are then sealed to produce a fluid-tight joint. Preferably this sealing is accomplished along the line of the clamping earlier accomplished. It should be understood that the foregoing is a description of the preferred method. In some practices it will be found not to be necessary to employ all of the steps of the described method. It will be apparent to those skilled in the art that certain changes may be made in some of the steps of the described method. For example, the sealing might be performed at the same time as the clamping and before the external pressure is applied to the film to cause it to conform to the size of the product.

By the practices of the described method we are able to substantially reduce the resulting stresses in the finished packages. The film conforms neatly to the product giving a tight package to best show off a product in the package. Fewer leakers are produced during the sealing operation and the reduction in the strains in the film reduces the number of leakers occasioned by the subsequent handling of the packaged product.

In the foregoing description the packages were only evacuated. If backfilling of the package is required, this would be performed prior to the step of clamping the edges of the film. No substantial variation in the remainder of the process would be involved.

In the illustrated embodiment a case generally 10, having a cavity 11 therein, is employed as an enclosure within which the method may be carried out so as to enable one to adjust the atmosphere within the completed package. Case 10 has a lid 12 which may be raised and lowered during the carrying out of the process by any suitable means such as a fluid cylinder 13 having a piston rod 14 being secured to block 15, with the block in turn being screwed to lid 12. Pipes 16 and 17 connect the ends of cylinder 13 to a four-way valve 18 having a control rod 19. Pipe 21 connects valve 18 to a suitable source of fluid pressure (not shown), while pipe 22 is an exhaust.

Case 10 including top 12 is formed of an electrical insulating material such as polystyrene or a urea formaldehyde resin. An electrode 23 in the form of a flat plate is secured to the underside of lid 12 by means of bolts 24 threaded into lid 12. A rubber gasket 25 is secured to the lower face of cover 12 adjacent the periphery thereof. The disclosed embodiment was devised for preparing a package in accordance with the teachings of Patent No. 2,621,129, wherein a film is secured to a laminated stiffening member. To facilitate the handling of the laminated stiffening member 26, lid 12 is provided with a vacuum cup arrangement to hold the laminated board 26 in place while the cavity 11 is being filled and the case 10 being closed. To this end a central portion of electrode 23 and lid 12 are cut out to form a vacuum cup 27. A passageway 28 through lid 12 and block 15 communicates with the vacuum cup with the other end of the passageway being threaded to receive a flexible connection to a suitable source of vacuum, not shown.

The structure for closing the electrodes about the edges of the packaging material is disclosed and claimed in application Serial No. 271,786, now Patent No. 2,730,281, and forms no part of the present invention, although we prefer to use it and it is shown in the disclosed embodiment. In a structure of this type a rubber diaphragm 30 has its edges secured between the two portions 31 and 32 of the bottom half of case 10. The portions 31 and 32 are securely fastened together at each side of the diaphragm by means of bolts, not appearing in the drawing. Resting on diaphragm 30 and centered within the cavity 11 is a plate 33 on which is a rectangular electrode holder 34 formed of a conductor such as copper or brass. The size and shape of the electrode holder 34 generally will be dependent upon the packages being produced. Within the central portion of electrode holder 34 is a sheet 35 of thermal insulating material, as for example asbestos. A sponge rubber pad 36 is mounted on the insulating sheet 35 to resiliently support the material to be formed into a package.

Electrode holder 34 has a continuous ridge 38 which forms an electrode to cooperate with plate 23 in the clamping and sealing of the package. Through a cylindrical opening 39 in holder 34 is an electrical resistance heating element 40 surrounded by an electrical insulating material 41. The ends of resistance element 40 are connected to a suitable source of electrical power not shown. The inner face of electrode holder 34 has a covering of electrical insulating material 42. A plurality of vents 45 communicate between the space 46, within the boundaries of electrode holder 34, and the space 47 between electrode holder 34 and portion 31 of case 10.

Pipe 49 is threaded into the case 10 and communicates with space 47. With suitable connecting fittings and valves 50 through 52, pipe 49 may be placed in communication with the outside atmosphere by the operation of valve 50; a suitable source of low pressure (vacuum) 53 by the operation of valve 51; or a container 54 of inert gas by the operation of valve 52. A threaded opening 55 in portion 32 of case 10 communicates with the space 56 below diaphragm 30 and receives a pipe 58. Pipe 58 can be placed in communication with a source of vacuum 53 by the operation of a valve 59 or with atmosphere through the operation of valve 60.

A flexible electrode connector 62 is attached to electrode holder 34 and extends through the wall of case 10. A second electrode connector 63 is mounted on cover 12 and is held by a nut 64 on one of bolts 24, bolt 24 of course being formed of a conductive material. Wire link connectors 62 and 63 with a source of electrical power 65 suitable for dielectrically sealing the particular wrapping material that is chosen for the package.

Valve stem 19 is positioned so that piston rod 14 is pulled in and cover 12 raised from the remainder of case 10. A sheet of wrapping film 67, in the illustrated embodiment a sheet of polyvinylidene chloride, is laid within cavity 11 so that it overlies all portions of ridge 38 forming the lower electrode with the product to be wrapped, in the illustrated embodiment slices of ham 68, centered within the sides of the electrode holder 34. The sheet of backing material 26 having a face of polyvinylidene chloride is slipped within the cover 12 with the polyvinylidene chloride face down and held in place by the application of a vacuum to vacuum cup 27. Valve 18 is then actuated to operate cylinder 13 and lower the cover 12 onto the remainder of the case 10. Rubber gasket 25 seals the space between the two halves of the case. Valve 51 is opened to apply a vacuum to spaces 47 and 46 and at the same time valve 59 is opened to apply a vacuum to the space 56 below diaphragm 30. Valve 51 is closed and if backfilling of the package is desired, valve 52 will be opened. With the product described there is no backfilling.

Before starting, the heater 40 was energized to warm electrode holder 34 to betweeen about 180 to 240 degrees Fahrenheit. When the mold was closed the air within the cavity was warmed by the temperature of the electrode holder. Similarly the film 67 is warmed by radiation from and contact with the electrode holder 34.

With a vacuum still existing above diaphragm 30 valve 59 is closed and valve 60 is opened to apply atmospheric pressure below diaphragm 30. If the cavity has been completely backfilled, super-atmospheric pressure is now applied to space 56. In either event diaphragm 30 and the structure supported thereon is pushed upwardly by the fluid pressure differential to clamp film 67 and backing member 26 between electrode 23 and electrode 38. At this point valve 50 is opened very slightly to permit only a trickle of atmospheric air to re-enter spaces 47 and 46. Preferably these spaces are not brought completely back to atmospheric pressure. In our operations of the disclosed embodiment we have used initial vacuums of about one-half inch of mercury. Air is then slowly re-admitted by valve 50 to an extent to raise the pressure within the spaces 46 and 47 to about five to eight inches of mercury. The slowness is of such an order that this increase is obtained within a minimum time interval of about one second. This slow addition of pressure draws the softened film tightly about the product 68 and acts to flatten out wrinkles that may have been produced in the film 67 when it was folded about the product.

After the pressure is raised to this extent about the outside of the film 67, the electric generator 65 is utilized to apply a high frequency heating current to the upper and lower electrodes to seal the film along the line of the lower ridge 38. After the package is sealed the valve 50 is opened to raise the pressure within the spaces 46 and 47 to atmospheric and valve 18 is operated to raise cover 12. Vacuum cup 27 may be operated in a manner to lift the package from the cavity as the cover is raised. The breaking of the vacuum to the vacuum cup will then drop the completed package onto a suitable conveying mechanism, not shown.

The foregoing description of a specific embodiment is for the purpose of compliance with 35 U. S. C. 112, and we do not desire to be limited to the exact details shown and described, for obvious modifications will occur to persons skilled in the art.

This application is a division of our copending application Serial No. 413,617, filed March 2, 1954.

We claim:

1. The method of preparing packages of product sealed in a thermoplastic packaging material including the steps of placing the product within the packaging material, vacuumizing the space within the packaging material, preheating the packaging material to render the material more pliant, thereafter clamping the edges of the packaging material to produce a fluid tight joint, applying a fluid pressure to the outer surface of the packaging material greater than that existing on the inner side of the packaging material to draw the pliant material about the product, and sealing said edges.

2. The method of preparing packages of product sealed in a packaging material including the steps of placing the product within the thermoplastic packaging material, vacuumizing the space within the packaging material, preheating the packaging material to render the material more pliant, thereafter clamping the edges of the packaging material to produce a fluid tight joint, and sealing said edges.

3. The method of preparing packages of product sealed in a packaging material including the steps of placing the product within the packaging material, evacuating the majority of the air within the packaging material while heating the air remaining within the packaging material, thereafter clamping the edges of the packaging material to produce a fluid tight joint, applying a pressure to the outer surface of the packaging material greater than that existing on the inner side of the packaging material, and sealing said joint.

4. The method of preparing packages of product sealed in a thermoplastic packaging material including the steps of placing the product within the packaging material, preheating the packaging material to render the material more pliant, thereafter clamping the edges of the packaging material to produce a fluid tight joint, applying a fluid pressure to the outer surface of the packaging material greater than that existing on the inner side of the packaging material to draw the pliant material about the product, and sealing said edges.

5. The method of preparing packages of product sealed in a packaging material including the steps of placing the product within the packaging material, evacuating the majority of the air within the packaging material while heating the air remaining within the packaging material, thereafter clamping the edges of the packaging material to produce a fluid tight joint, and sealing said joint.

References Cited in the file of this patent

UNITED STATES PATENTS

| | | |
|---|---|---|
| 2,621,129 | Ramsbottom et al. | Dec. 9, 1952 |
| 2,623,826 | Grinstead | Dec. 30, 1952 |
| 2,668,403 | Rumsey | Feb. 9, 1954 |

OTHER REFERENCES

"Modern Packaging," May 1950, pp. 99, 100 and 101, article entitled Vacuum-Pre-Packaged Meats.